United States Patent [19]

Boyer

[11] Patent Number: 5,472,528
[45] Date of Patent: Dec. 5, 1995

[54] HEAT-TREATMENT METHOD FOR METAL STRIPS

[75] Inventor: Michel Boyer, Bois Le Roi, France

[73] Assignee: Stein Heurtey, Ris Orangis, France

[21] Appl. No.: 263,213

[22] Filed: Jun. 17, 1994

Related U.S. Application Data

[63] Continuation of Ser. No. 32,059, Mar. 16, 1993, abandoned.

[30] Foreign Application Priority Data

Mar. 19, 1992 [FR] France .................................. 92 03311

[51] Int. Cl.⁶ ..................................................... C21D 1/42
[52] U.S. Cl. ......................... 148/567; 266/103; 266/111
[58] Field of Search .................................. 266/103, 111; 148/567

[56] References Cited

U.S. PATENT DOCUMENTS

| | | | |
|---|---|---|---|
| 3,447,745 | 6/1969 | Perrine et al. | 266/87 |
| 4,358,093 | 11/1982 | Shimoyama et al. | 266/111 |
| 4,363,471 | 12/1982 | Yanagishima et al. | 266/103 |
| 4,760,995 | 8/1988 | Fukuda et al. | 266/103 |

FOREIGN PATENT DOCUMENTS

| | | |
|---|---|---|
| 107991 | 5/1984 | European Pat. Off. |
| 2406667 | 5/1979 | France . |

OTHER PUBLICATIONS

Patent Abstracts of Japan, vol. 6, No. 180 (C-125) Sep. 14, 1982 & JP-A-57 094 524 Jun. 12, 1982.
Patent Abstracts of Japan, vol. 6, No. 90 (C-104) May 27, 1982 & JP-A-57 019 336 Feb. 1, 1982.

Primary Examiner—Scott Kastler
Attorney, Agent, or Firm—Pollock, Vande Sande & Priddy

[57] ABSTRACT

Method of continuous heat-treatment of metal strips, wherein the strip which is to be heat-treated passes through a furnace which is thermally isolated and in a protective atmosphere, consisting of heating, holding and cooling sections; the said strip is guided by a plurality of return rolls situated in the upper and lower parts of the said sections and thus forms a plurality of lengths and they pass in front of cooling and traditional heating (generally produced by a radiation source or using naked flames), and induction means, the latter are placed upstream of at least one traditional heating section and are used combined and simultaneously with the other heating means in order to compensate for the variations in the heat-treatment parameters.

3 Claims, 5 Drawing Sheets

HEAT-TREATMENT METHOD FOR METAL STRIPS

This application is a continuation of U.S. patent application Ser. No. 08/032,059, filed Mar. 16, 1993, now abandoned.

FIELD OF THE INVENTION

The present invention relates to a heat-treatment method for metal strips. It more particularly relates to industries with a heavy consumption of sheet metal, in which the best means of making savings is to reduce the mass, and therefore the thickness, of the sheet metal, while preserving excellent mechanical properties. An operation of continuous annealing perfectly satisfies these requirements.

BACKGROUND OF THE INVENTION

The invention is concerned with the technology of continuous strip annealing furnaces. Such furnaces are used in continuous annealing lines or in continuous galvanizing lines, yet the invention may be applied to other types of installations in which the strips are continuously treated, in particular in varnishing, coating and painting installations.

The method hinges around one or more strip annealing furnaces which consist of several sections equipped to perform consecutively the various phases of the heat-treatment cycle which are, in the simplest case: heating, holding and cooling.

At the end of each of the phases, the temperature reached by the product is determined and must be stabilized in order to obtain the required metallurgical characteristics. In particular, the temperature at the end of heating is very precise.

The operation is easy and is currently executed when the furnace operates in steady-state; it treats a product of given dimensions at a constant speed and according to an established heat-treatment curve.

Known industrial furnaces work daily with strips of different thickness and width in annealing cycles which are also variable.

Inevitably, transitional periods result during which the annealing temperature is difficult to reach and control in current heating chambers. The latter generally use traditional radiation or naked flame sources, and both are characterized by their significant thermal inertia.

The users have introduced measures which make it possible to reduce the duration and amplitude of the variations in annealing temperature during transitional periods of changing strip size.

The use of computers, dedicated to conducting these methods which follow the thermal state of the furnace in real time and control the change in the heating parameters and in the treatment speed, has afforded a partial solution to the problems.

In fact, these procedures introduce variations in treatment speed in the essential heating phase which affect the running and the performances of the other parts of the furnace or of the installation, such as in particular the cooling section or the coating section of a galvanizing line.

SUMMARY OF THE INVENTION

The present invention sets out therefore to improve the traditional heating sources by the use of heating by electromagnetic induction for the continuous treatment of metal strips. In fact, induction heating may be used in two groups of application:

The first, at moderate temperature (from 100° to 300° C.) relate to drying and varnishing.

The second, such as in particular annealing, involve higher temperatures.

For thin sheet metal, the traditional radiation furnace may seem more attractive by virtue of its lower investment costs, but induction has several incomparable advantages and is particularly suitable for surface heat-treatments of metals. Advantageous properties which may be mentioned are:

possibility of higher power density than for any other method, substantially constant consumption whatever the width of the strip to be treated and without changing the inductor, facility of transmitting energy without contact and without influence on the surface state of the product to be heated, better precision and stability of the heating, no difficulty in ensuring the treatment under a controlled atmosphere, reduced bulk, start-up and shutdown of the induction device practically instantaneously, which avoids any wastage on shutdowns and on changes of the size of sheet metal, possibility of automatically linking the energy power to the speed or to the temperature with a very low time constant, high degree of automation.

The subject of the invention is a method of heat-treatment, characterized in that the strip which is to be heat-treated passes through a furnace which is thermally isolated and in a protective atmosphere, consisting of heating, holding and cooling sections; the said strip is guided by a plurality of return rolls situated in the upper and lower parts of the said sections and thus forms a plurality of lengths and passes in front of cooling and traditional heating (generally produced by a radiation source or using naked flames), and induction means, the latter are either placed upstream or downstream of at least one traditional heating section, or arranged so as to divide at least one traditional heating section into parts and are used combined and/or simultaneously with the other heating means in order to compensate for the variations in the heat-treatment parameters.

Other characteristics and advantages of the present invention will emerge from the description which is given hereinbelow, with reference to the attached drawings which illustrate an embodiment thereof which is in no way limiting. In the figures:

DETAILED DESCRIPTION OF THE INVENTION

Figure 1:
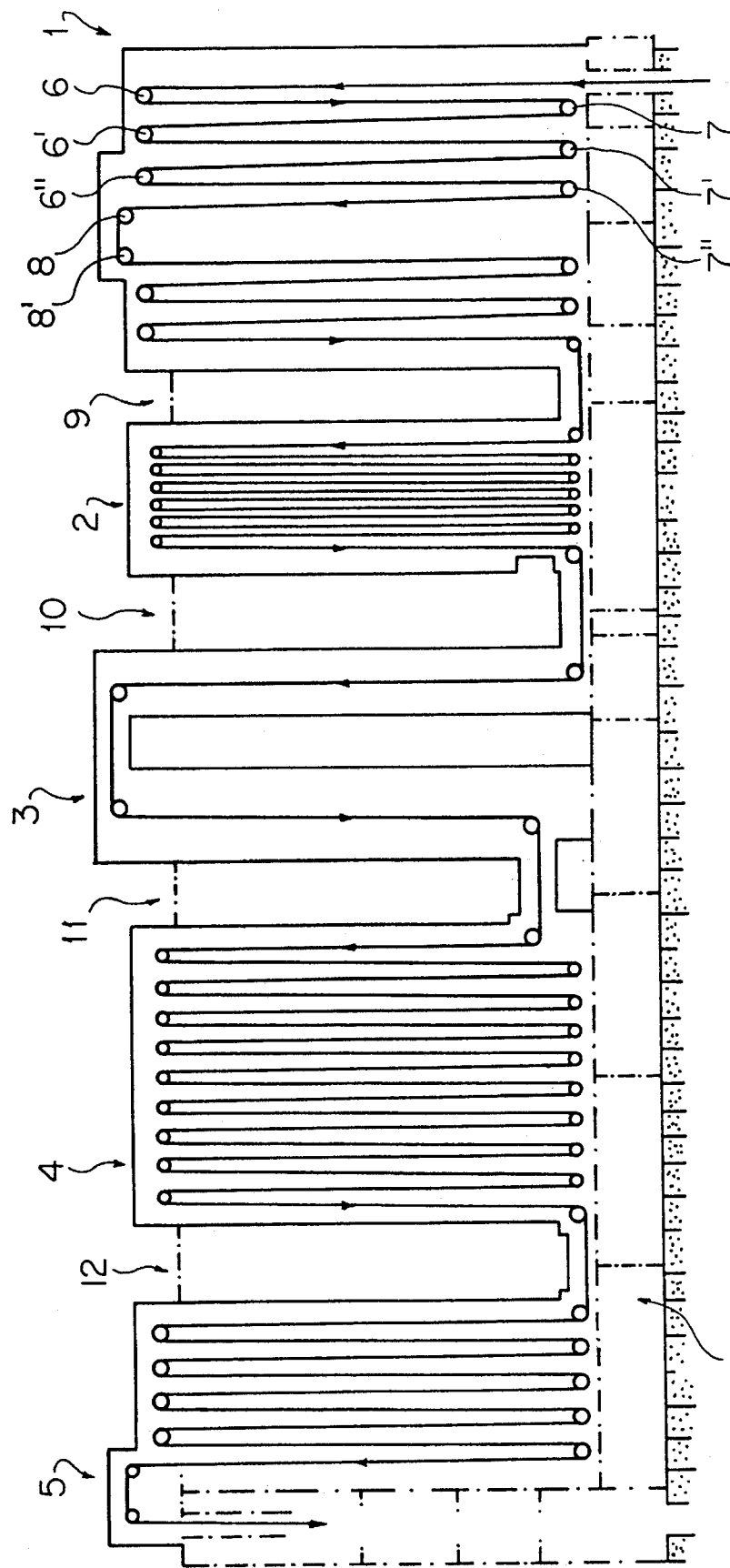
FIG. 1 is a sectional plan view of a furnace implementing the method of continuous annealing of a sheet metal strip.

According to a preferred embodiment of this method, the strip to be treated passes inside a vertical or horizontal continuous annealing furnace.

This furnace generally consists of heating 1, holding 2 and cooling 3 sections. Their number and their arrangement vary widely, holding sections 2, 4 for the correct establishment of the crystallographic conversions may coexist between the various cooling sections.

The strip therefore runs through the various sections of the furnace, in the context of a vertical furnace, it is guided by a plurality of fixed rolls 6, 6', 6", 7, 7', 7" driven in rotation, situated at the upper and lower ends of the volumes or chambers forming the treatment enclosures.

The strip stretches in a loop between two top 6 and bottom 7 return rolls. The conventional induction heating means 14 and the cooling units are all arranged between the lengths of the strip or opposite the external walls.

The conventional heating means mainly consist of heating elements, of tubular shape, inside which the combustion of a liquid or gaseous fuel is supported. These elements called radiating tubes are placed between the lengths of the strip and facing the front walls of the furnace and heat the strip by radiation. They provide the majority of the energy supply and they operate when the installation runs in steady-state.

It is obvious that all the enclosures are thermally insulated from the surroundings 9, 10, 11, 12, 13 by appropriate lagging. Each of the enclosures is fitted with units for centering the axis of the strip on the axis of the line, and they consist of rolls 8, 8' which are similar to the guide rolls and are mounted so as to move inside supports in order to adjust the length developed between two fixed guide points 6', 7'. They may, if required, be substituted for the guide rolls and are present in the heating 1, temperature-holding 2, 4 and cooling 3, 5 sections.

The cooling means are generally produced by devices for blowing a protective gas which is recycled and cooled in exchangers outside the installation. This blowing, at a variable speed as a function of the heat-exchange requirements, occurs along a direction perpendicular to the path of the strip and through a plurality of orifices or slots arranged on the blowing means.

The various chambers are connected together by connection tunnels, the whole thing possibly being held under a neutral protective atmosphere consisting in particular of nitrogen and hydrogen.

Figure 2:
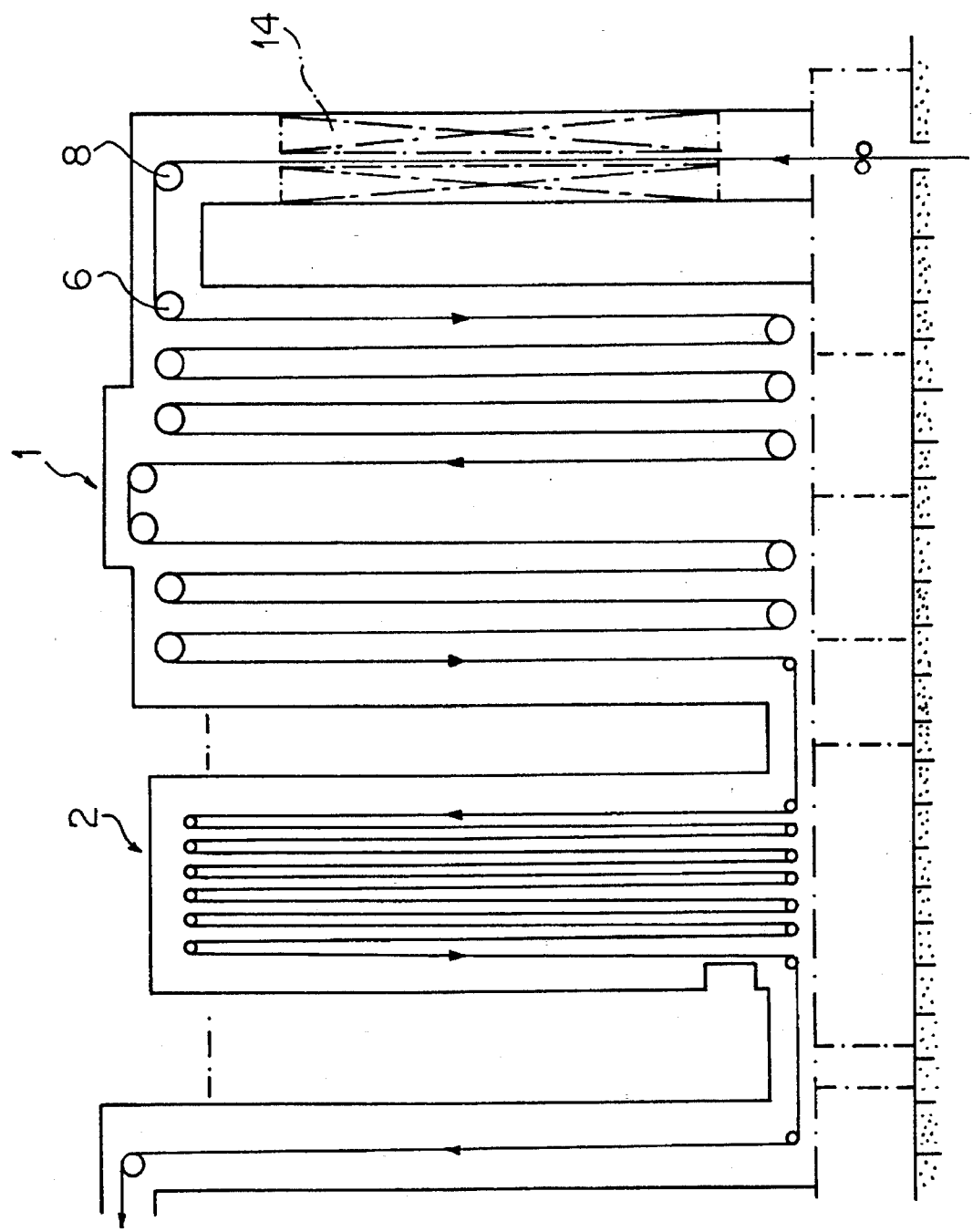
FIG. 2 is a plan view on an enlarged scale of a traditional heating section fitted, upstream, with an induction heating device.

Referring to FIG. 2, a strip progresses as follows:

The strip enters a first heating enclosure 1 which comprises, in addition to traditional heating sources, an induction device 14 placed at the start of the path of the strip. In this portion, the strip undergoes an increase in temperature up to its annealing temperature corresponding to the desired heat-treatment, then it passes into a holding chamber 2 in which the energy supply is held constant for establishing the crystallographic conversions. Its temperature is lowered by the means previously explained in an enclosure called a cooling enclosure 3 (FIG. 1), the temperature decreases rapidly, the development of the crystallographic conversions is stopped.

It subsequently passes through a chamber intended for what is commonly called "overaging" 4, this chamber is designed in a similar manner to the holding enclosure and it is situated between two cooling chambers.

The last cooling 5 is generally not produced as the previous one by gas/solid exchange, but by a liquid/solid exchange, which is much more efficient, the procedure is to spray liquid onto the advancing strip.

The finished product is rolled up or delivered at the exit of the installation.

Figure 3:
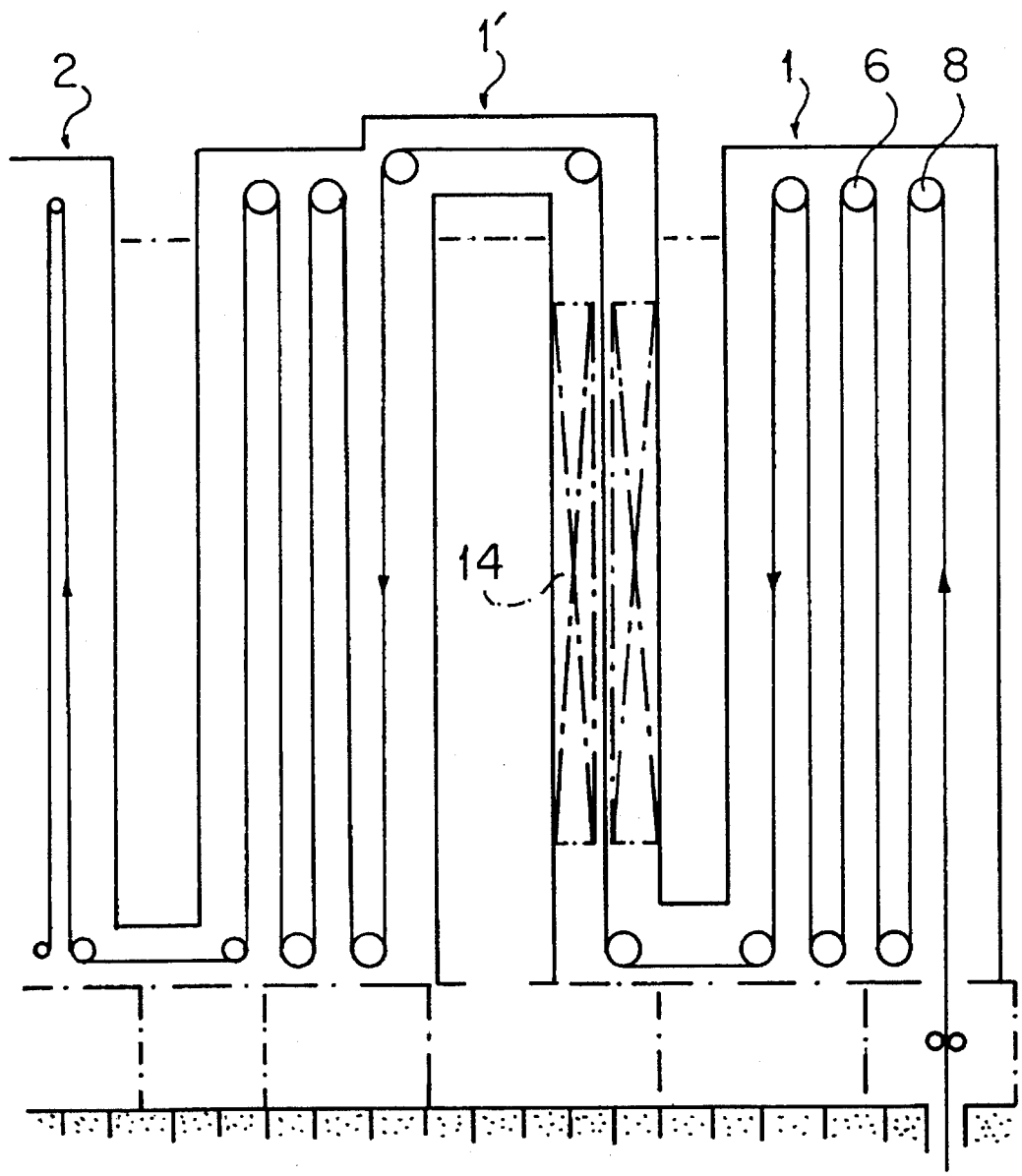
FIG. 3 is a plan view on an enlarged scale of a traditional heating section fitted, on the inside, with an induction heating device which divides the section into parts.

According to another mode of implementation of the method, the heating enclosure is divided into several parts 1, 1' (cf. FIG. 3), the induction device 14 is no longer placed upstream of the installation but between the heating chambers, in particular downstream.

The effects of these induction devices are according to requirements coupled with or uncoupled from the other traditional heat sources, but in any case, they are intended to operate during the transitional periods of the treatment.

The operational regime of the installation, in transition, principally comprises two modes, one called positive, the other called negative, which are each characterized by foreseeable and unforeseeable events.

Figure 4:
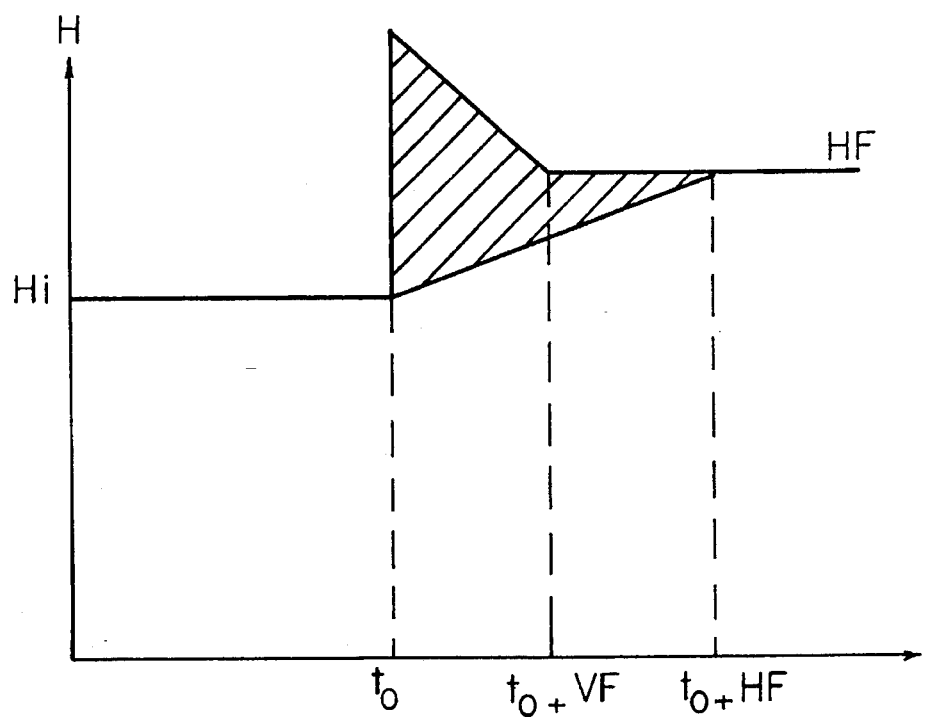
FIG. 4 is a diagram of the change in the heat supply as a function of time between two stable states for a positive mode of operation.
Figure 5:
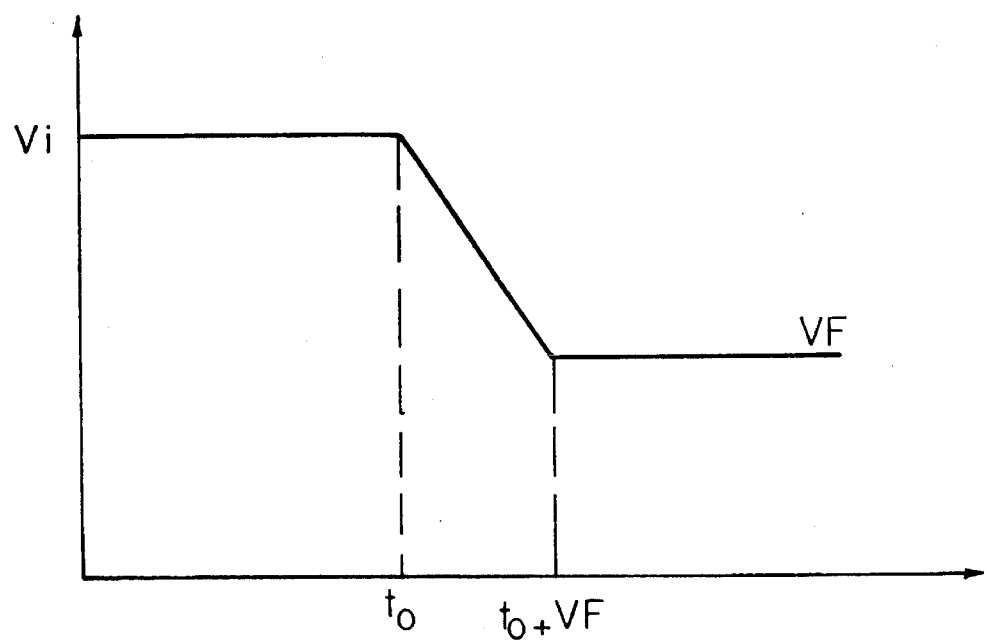
FIG. 5 is a diagram of the change in the speed of advance of the strip as a function of time between two stable states for a positive mode of operation.

The positive mode of operation is advantageously explained, for an increase in the cross-section of the product to be treated which leads to a reduction in the speed of the strip from Vi to Vf, by studying the graphs in Figures Four and Five, namely for the change in the overall heat supply (H) as a function of time (cf. FIG. 4), carried respectively on the ordinate and abscissa, it is seen that the energy supply due to the inductor, shaded zone, compensates, during the time lapse between to representing the change of product (in other words the passage of increase in cross-section at the input of the inductor requiring a decrease in the speed of the strip, cf. FIG. 5) and t0+Vf which represents the instant at which the speed of advance of the final product is reached, then t0+Hf which is the instant at which the heat supply to the strip is reached by the traditional heating means, the thermal inertia of the traditional heating means between two stable states characterized by:

an initial speed Vi, for an energy level Hi a final speed Vf, for another energy level which is different from the previous one Hf.

Figure 6:
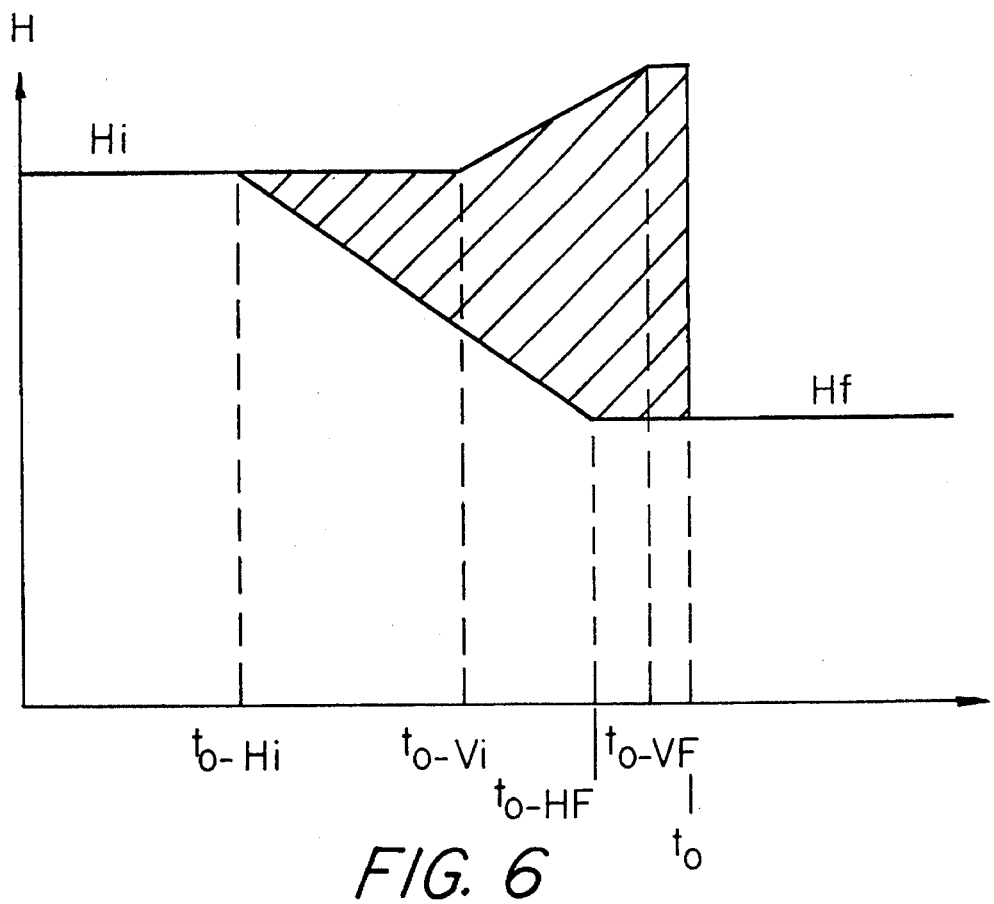
FIG. 6 is a diagram of the change in the heat supply as a function of time between two stable states for a negative mode of operation.

Similarly, the negative mode of operation is usefully supported, for a decrease in cross-section of the product to be treated which leads to an increase in the speed of the strip from Vi to Vf, by the graphs in Figures Six and Seven; indeed, the shaded zone which represents the energy supply (cf. FIG. 6), (H) on the ordinate, due to the inductor during the time on the abscissa, compensates from an instant starting from t0-Hi, called the resetting time of the furnace, to t0-Vi representing the instant at which the speed of advance of the final product is exceeded, then extending to t0-Vf which is the instant at which the speed of advance of the final product is reached, then finally to the moment t0 which is the change of product (passage of decrease in cross-section at the entry of the inductor), the unavoidable inertia of the traditional heating source which, however, requires a sufficient quantity of heat to be maintained (by the inductor) for the time necessary for the appearance of the new energy level (Hf) which is less than the previous one (Hi).

It is desired to minimize, in time, the consequences for the product by reducing the transitional regime between an initial state, corresponding to a stabilized thermal regime (Hi) of a traditional heat source (a speed Vi, a strip temperature Ti) and to a given strip size (a thickness Ei, a width Li, an emissivity Emi) and a final state corresponding to another stabilized thermal regime (Hf) (a speed Vf, a strip temperature Tf) and to another band size (a thickness Ef, a width Lf, an emissivity Emf).

The positive mode of operation is characterized in the following manner, in the case of foreseeable events:

the user observes by monitoring the strip at the input of the induction that one of the following characteristic parameters of the strip:
increase in the cross-section of the product to be treated (E and/or L)
variation in the emissivity of the product (Em)
increase in the temperature at the end of heating of the product (T) is going to change, which, in the absence of the inductor, could lead to an expected reduction in the speed of advance of the strip.

For an installation fitted with an induction device placed upstream (cf. FIG. 2) of the heating section, the actions are as follows (cf. FIGS. 4 and 5):

actuating the inductor 14 and increasing the energy supply without thermal inertia and without reducing the initial speed Vi, leading immediately to a rise to the temperature Tf corresponding to the exit temperature of the strip, this being at the end of the traditional heating section,
setting the increase in heat supply of the traditional heating means, which leads:
to an increase in the energy supply of the traditional heating source to its final level, compensated for by a
progressive or stepwise reduction in the energy supply of the inductor.

By this mode of reaction, it is possible, by virtue of the induction device, to avoid (in the absence of the induction device):

an underheating of a part Bf of the strip (head of the strip) if a reduction in speed (from Vi to Vf) has not been anticipated before the event,
incorrect anticipation of a reduction in speed leading to:
underheating of a part Bf of the product (head of the strip),
an overheating of the part Bi of the product (tail of the strip),
a loss in production.

The transitional regime of a positive mode will now be studied, but characterized by an unforeseeable event (increase in the speed on setting by the operator following an external event, degraded automatic running during a foreseeable event). The action of the inductor is as follows:

it becomes possible instantaneously to compensate for the insufficiency and the inertia of the traditional heating which arises at the moment of appearance of the event.

The effect produced by this variation in inductive energy supply is applied only to the portion of the product treated contained between the entry of the traditional heating device and the end of the inductive heating section.

It is obvious that the part of the product contained between the exit of the inductive heating and the end of the traditional heating does not benefit from the change in heating power level.

This is the reason (cf. FIG. 3) why the induction device 14 is placed so close to the end of the traditional heating section (which corresponds to the second mode of implementation seen hereinabove).

The improvement is as follows, in a traditional furnace the duration of a transitional regime lies between 2 and 5 min and often more, the length of product corresponds to a time between 30 s and 1 min, the presence of an induction device upstream of the progression of the strip (first mode of implementation of the method) constitutes an undeniable advantage.

The second, so-called negative, mode of operation will now be studied, for each of the foreseeable and unforeseeable events.

The negative mode is characterized in the following manner (foreseeable events, observations of monitoring the strip at the entry of the inductor), decrease in the cross-section of the product to be treated (E or L),
variation in the emissivity of the strip (Em),
decrease in the temperature at the end of heating (T).

Figure 7:
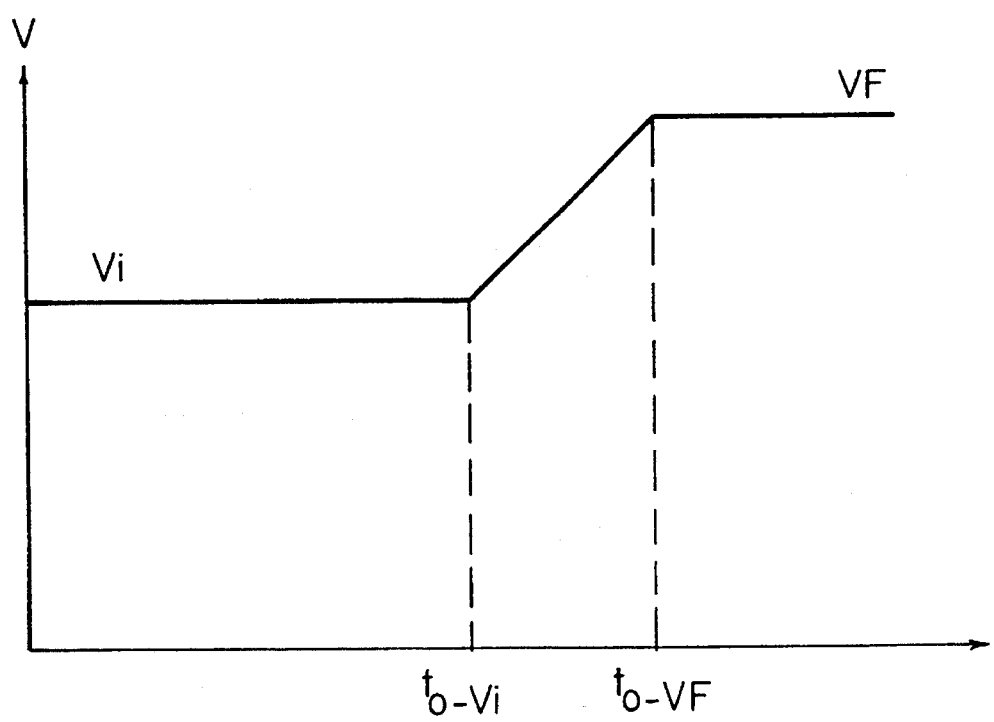
FIG. 7 is a diagram of the change in the speed of advance of the strip as a function of time between two stable states for a negative mode of operation.

For a negative mode and for one of the foreseeable parameters (cf. FIG. 2) previously described, the actions are as follows (cf. FIGS. 6 and 7):

before the appearance of the event (passage of reduction in cross-section at the entry of the inductor), the user increases the energy supply by starting it in order to compensate:
for a necessary decrease in the traditional heating device from its initial value to its final value, which takes place before the appearance of the event, and this as a function of the thermal inertia of the traditional heating,
for an increase in the speed of treatment from Vi to Vf so that the final speed is reached before the appearance of the event.

On appearance of the event, turning the inductor off and consequently immediate disappearance of its energy supply.

The presence of the induction device upstream of the installation and with respect to this operating situation provides the following advantages:

avoidance of overheating of a part of the product Bf (head of the strip) if the increase in speed V (from Vi to Vf) has not been correctly anticipated, and (for incorrect anticipation of the increase in speed V) avoidance:
of an underheating of a part of the product (tail of the strip of the product Bi),
of a loss in production if V<Vf.

A negative mode of operation will now be studied in the case of unforeseeable events (cf. FIG. 3):

decrease in the speed on setting by the operator or following an external event,
degraded automatic running.

It becomes possible immediately to compensate for the excess heating which occurs at the moment of the appearance of the event. This decrease is instantaneous and is brought about by switching the inductor off.

As before, the effect produced by these variations in inductive heating supply is applied only to the portion of the strip situated between the entry of the traditional heating means and the end of the inductive heating. It is necessary to install the induction heating as close as possible to the end of the traditional heating section.

Whatever the modes of implementation of the method, either negative or positive, and characterized by foreseeable or unforeseeable events, the inductive heating power must represent a non-negligible part of the total installed heating capacity.

In the normal operating regime, the heating will be performed principally using all the traditional power installed and a part of the inductive power.

Reading the preceding description shows that the method brings novelty to the use of combined and/or simultaneous induction heating with traditional heating; in fact, it allows the capacity and flexibility of the existing installation to be increased.

It satisfies partially or completely the constraints required for a section in question:

temperature holding time, and diffusion time required for the heat-treatment of the strip, predetermined and stable speed variation gradient.

It remains, of course, that the present invention is not limited by the embodiments described and represented hereinabove, but that it encompasses all variants thereof.

Thus, although the embodiment described hereinabove relates to a vertical furnace, it is obvious that the invention may also relate to a horizontal furnace in which the strip is transported by rolls which are also driven without forming vertical lengths but simple catenaries of very small amplitude.

I claim:

1. A method of continuous heat-treatment of a metal strip in a thermally insulated and protective environment, comprising the steps of:

establishing an initial serial zone through which the strip passes for heating;

subjecting the strip to radiation heating throughout at least the initial zone;

subjecting a length of the strip to variable induction heating, simultaneous with the radiation heating, in a section of the initial heating zone;

whereby the induction heating compensates for variations in heat treatment parameters of the radiation heating as the strip is heat treated;

maintaining the strip at a preselected constant energy level for a preselected period in an upstream serial zone, after passage through the initial zone, until crystallographic conversion has occurred in the strip; and cooling the strip in a serial zone located further downstream.

2. The heat treatment method set forth in claim 1 wherein the induction heating section is positioned immediately upstream of an entry point of the initial heating zone for instantaneously increasing the heat energy supplied to the strip when required, thereby compensating for thermal inertia exhibited by radiation heating.

3. The heat treatment method set forth in claim 1 wherein the induction heating section is positioned at an intermediate point along the length of the initial heating zone.

* * * * *